US005245515A

United States Patent [19]

Schwaller et al.

[11] Patent Number: 5,245,515

[45] Date of Patent: Sep. 14, 1993

[54] HEADLIGHT

[75] Inventors: Edwin Schwaller, Kuttigen; Walter Zurcher, Aarau; Diego Bally, Zurich, all of Switzerland

[73] Assignee: Vereinigte Drahtwerke A.G., Biel, Switzerland

[21] Appl. No.: 788,228

[22] Filed: Nov. 5, 1991

[30] Foreign Application Priority Data

Nov. 12, 1990 [CH] Switzerland ...................... 3577/90-0
Nov. 20, 1990 [CH] Switzerland ...................... 3577/90-0

[51] Int. Cl.[5] ............................................ B62J 6/02

[52] U.S. Cl. ...................................... 362/72; 362/308; 362/329; 362/338

[58] Field of Search ................. 362/72, 215, 336, 308, 362/309, 328, 329, 331, 335, 338, 361, 61

[56] References Cited

U.S. PATENT DOCUMENTS

| | | | |
|---|---|---|---|
| 120,581 | 2/1919 | Phillips et al. | 384/416 |
| 1,433,292 | 10/1922 | Billman | 362/309 |
| 1,571,139 | 12/1923 | Nolen | 362/309 |
| 1,674,460 | 10/1925 | Zorger | 362/339 |
| 1,788,935 | 1/1931 | Wood | 362/215 |
| 3,235,720 | 2/1966 | Bridge | 362/309 |
| 3,244,869 | 4/1966 | Buck | 362/335 |
| 4,213,171 | 7/1980 | Sassmannshausen | 362/310 |
| 4,371,916 | 2/1983 | De Martino | 362/309 |
| 4,558,402 | 12/1985 | Tysoe | 362/331 |
| 4,577,260 | 3/1986 | Tysoe | 362/328 |

FOREIGN PATENT DOCUMENTS

| | | |
|---|---|---|
| 1101985 | 3/1961 | Fed. Rep. of Germany . |
| 1472525 | 1/1969 | Fed. Rep. of Germany . |
| 3143086A1 | 10/1982 | Fed. Rep. of Germany . |
| 3317519A1 | 11/1984 | Fed. Rep. of Germany . |

*Primary Examiner*—Ira S. Lazarus
*Assistant Examiner*—Y. Quach
*Attorney, Agent, or Firm*—Ladas & Parry

[57] ABSTRACT

The headlight has a light ray guiding disk which is domed towards the source of light. This light ray guiding disk is structured as integral formed article and includes at its central zone, which has the smallest distance from the source of light, a collective lens structure. By means of this a substantial portion of the light rays emitted from the source of light into a spatial angle in front of the source can be focussed in the direction of the axis of the headlight. The light ray guiding disk can be manufactured as simple formed article. A transparent ring in a signal color is foreseen outside the light ray guiding disk. By means of this disk the stray light is utilized for a lateral marking when the headlight is used e.g. in a bicycle lighting arrangement.

14 Claims, 4 Drawing Sheets

HEADLIGHT

BACKGROUND OF THE INVENTION

1. Field of the Invention

The present invention relates to a headlight for emitting light rays substantially along a headlight axis, which headlight has a source of light located on the headlight axis; a parabolic or elliptical reflector member; and a light ray guiding disk located in front of the source of light. This headlight is specifically suited as headlight for relatively low-power light sources such as for instance encountered at headlight apparatuses of bicycles.

2. Description of the Prior Art

In case of lighting devices, in which the supply power for the source of light is relatively weak, it is important that the generated light can be utilized in an optimal manner. As small as possible a portion thereof should get lost as stray light. Hereby it is to be differentiated between the light rays which travel from the source of light firstly onto the reflector member and which are reflected by same to extend approximately parallel, and those light rays which travel in a spatial angle from the source of light directly towards the light ray guiding disk. The first named, i.e. reflected light rays, can be rather easily deflected by the optics of the collective lens into the desired direction in order to produce a corresponding light cone. The light rays reaching the light ray guiding disk directly from the source of light pose the problem that the direction of the rays must be deflected relatively severely, for which task a collective lens must be present at the light ray guiding disk. This collective lens shall thereby cover as large as possible a spatial angle of the directly emitted light rays without, however, occupying a too large surface area of the light ray guiding disk. It has hereto already been suggested to bond a relatively thick collective lens to the inner side of the light ray guiding disk, which focuses the light rays coming directly from the source of light. This solution is, however, rather complicated and intrinsic regarding a manufacturing.

SUMMARY OF THE INVENTION

It is therefore a general object of the invention to provide a headlight which allows at an essentially unchanged expenditure regarding manufacture a substantially better utilization of the light rays coming directly from the source of light and allowing a reduction of stray light.

A further object is to provide a headlight in which the light ray guiding disk is designed as an integral formed article having a domed section facing the source of light and comprising a collective lens structure formed thereinto at a central zone having a smallest distance from the source of light, whereby a substantial portion of the light rays emitted from the source of light at a spatial angle ahead of the source of light is focussed to extend at least approximately in the direction of the headlight axis.

Because the light ray guiding disk is domed in the direction towards the source of light, a substantially larger spatial angle of the light rays stemming directly from the source of light can be utilized, whereby the collective lens structure, which is preferably designed as Fresnel lens, does not necessitate a substantial local thickening of the light ray guiding disk, which design does not lend itself to be controlled during the manufacture thereof. The light ray guiding disk designed in such a manner can for this reason be produced as integral shaped article of a plastic material or glass economically in accordance with common procedures. The stray light which is present in a reduced extent only is thereby utilized advantageously for the producing of a laterally visible illuminated zone at the headlight, for which task a transparent ring is formed at the periphery of the light ray guiding disk, through which zone the stray light exits radially.

BRIEF DESCRIPTION OF THE DRAWINGS

The invention will be better understood and objects other than those set forth above will become apparent when consideration is given to the following detailed description thereof. Such description makes reference to the annexed drawings, wherein :

Based on FIGS. 1 and 2 the optical structure of the headlight is initially explained basically prior to entering into further details. The headlight includes a source of light 1, which is preferably a halide lamp. In FIG. 1 this source of light is designed as a point only, however in practice it is a spiral. The source of light is located in the focal point of a parabolic or elliptical reflector member 2. The light rays from the source of light which impinge onto the reflector member are, therefore, reflected roughly parallel to the axis 3 of the headlight and impinge in this manner onto the light ray guiding disk 4. The light ray guiding disk 4 is shaped of a material which is pervious to light rays, e.g. of a transparent plastic material, such as PMMA. Its shape and structure essentially determines the course of the light rays of the headlight.

Figure 2:
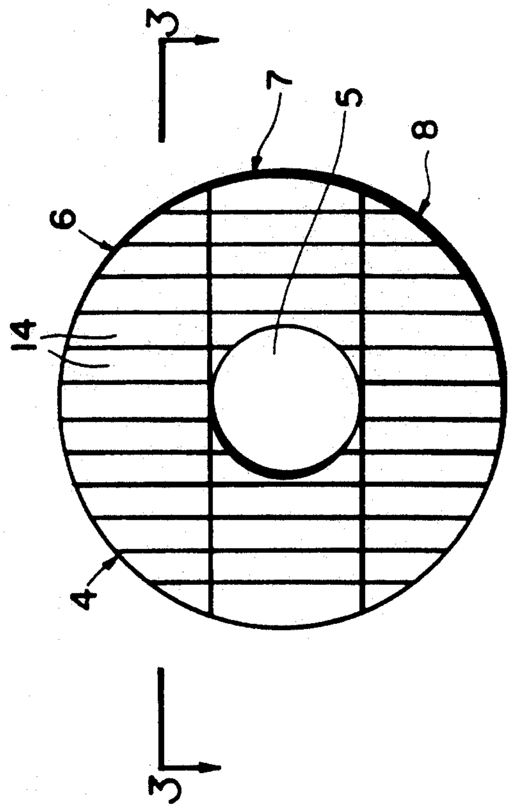
FIG. 2 is a front view of the light ray guiding disk.

The light ray guiding disk 4 is divided into different zones. A central zone 5 is arranged for a deflection of the light rays coming directly from the source of light 1. The edge zones 6, 7, 8 located adjacent to the central zone 5 are divided into an upper zone 6, a middle zone 7 and a lower zone 8 (see FIG. 2) and operate for the deflection of the light rays which are reflected parallel by the reflector 2.

The light ray guiding disk 4 is domed towards the source of light 1. This causes the central zone 5 to be located close to the source of light 1 such that it may collect a relatively large spatial angle of the light rays received directly from the source of light 1. The light rays reaching the light ray guiding disk in the area of this spatial angle are collected by means of a collective lens structure to a light ray bundle 10, which is emitted substantially in the direction of the axis 3 of the headlight.

In the central zone the structure of the collective lens is designed as a Fresnel lens 9, located concentrically to the axis 3, wherewith the thickness of the light ray guiding disk 4 remains roughly uniform. This is an important prerequisite for a manufacturing thereof as formed article made of a plastic material. Seen in the vertical section, the light ray guiding disk forms superimposed over this Fresnel lens a curve of the fourth order which causes the light rays extending at a higher area through this central zone 5 to be deflected somewhat stronger, i.e. towards the axis 3, than the rays extending at a lower area and which extend in the direction of the axis 3 (see FIG. 1). The result thereof in turn is that the cone of light which is obliquely incident on the roadway or another surface forms a light spot having a substantially constant brightness. In contrast to known headlights, the brightness in this light spot which is produced by the obliquely incident light cone, does not decrease at increasing distance from the headlight.

Figure 1:
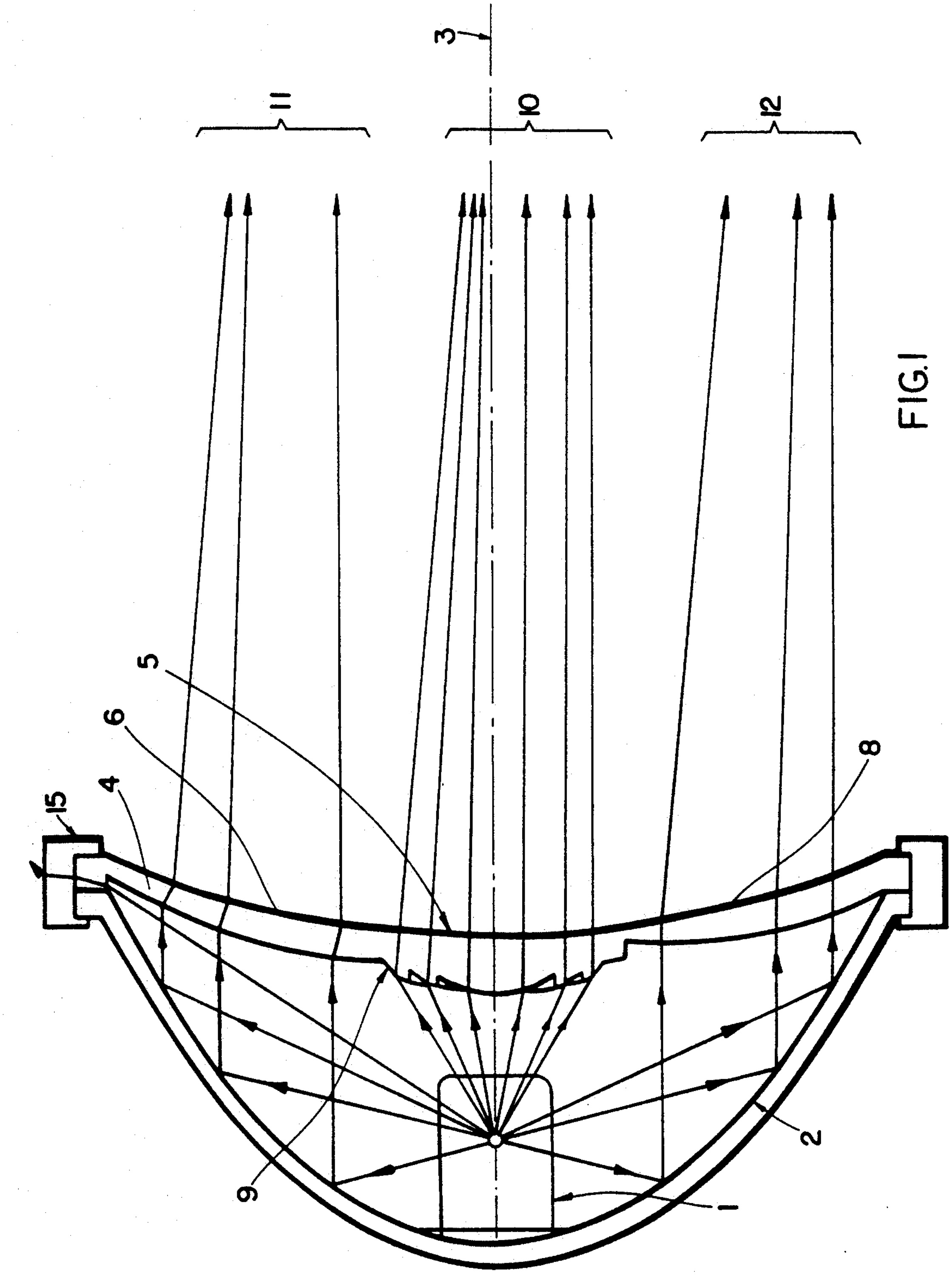
FIG. 1 is a vertical section through the headlight axis of a first embodiment of the inventive headlight.

A corresponding design of the light ray guiding disk is already present in the above mentioned edge zones 6, 7, 8, of which only the upper zone 6 and the lower zone 8 are visible in FIG. 1. Also here the light ray guiding disk forms when viewed in vertical section a curve in the fourth order additional to the circle leading to a corresponding stronger deflection of the light rays passing therethrough at a higher level. Accordingly, the light beams 11 and 12 emitted at these zones 6, 8 lead at an oblique incident also to a light spot at for example a supporting surface having a regular or uniform distribution of light.

Figure 3:
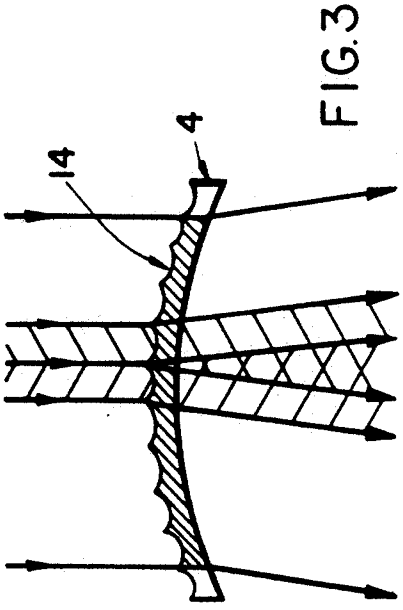
FIG. 3 is a section along line III—III of FIG. 2.

When viewing these zones in a horizontal section (see FIGS. 2 and 3), these zones have a dispersion lens structure 14 of a generally known kind, which leads according to FIG. 3 to a lateral diverging of the light cone. The edge zone 7 has the same design.

If the headlight structured in the manner set forth above is used as bicycle headlight, it produces at a distance of 4 to 10 meters from the position of the headlight on the roadway a light spot of uniform brightness of an approximately trapezoidal shape. Because the direct light rays of the spatial angle extending through the central zone 5 add to the brightness, the utilization of light is substantially increased.

FIG. 1 illustrates clearly that a part of the light rays from the source of light are neither reflected at the reflector member nor collected as direct light rays by the central zone. This stray light is now also utilized in that it exits laterally radially through a transparent ring 15. This transparent ring has preferably a signal color such that when viewed from the side a band, shining in a signal color, is visible (see FIG. 4). In this way the stray light of the headlight adds to the lateral marking of for example a bicycle rider in the night, a state which otherwise is only possible by passive reflectors. This transparent ring 15 at the same time can be structured as mounting member for the connection of reflector 2 and light ray guiding disk 4.

Figure 4:
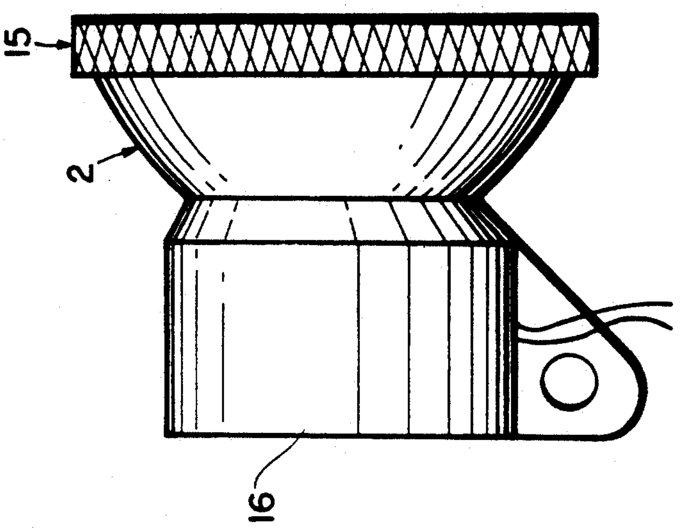
FIG. 4 is a side view of the headlight including its housing.

FIG. 4 illustrates a possible embodiment of the described headlight as bicycle headlight. The headlight with its signal ring 15 and reflector 2 is mounted at a housing 16.

Figure 5:
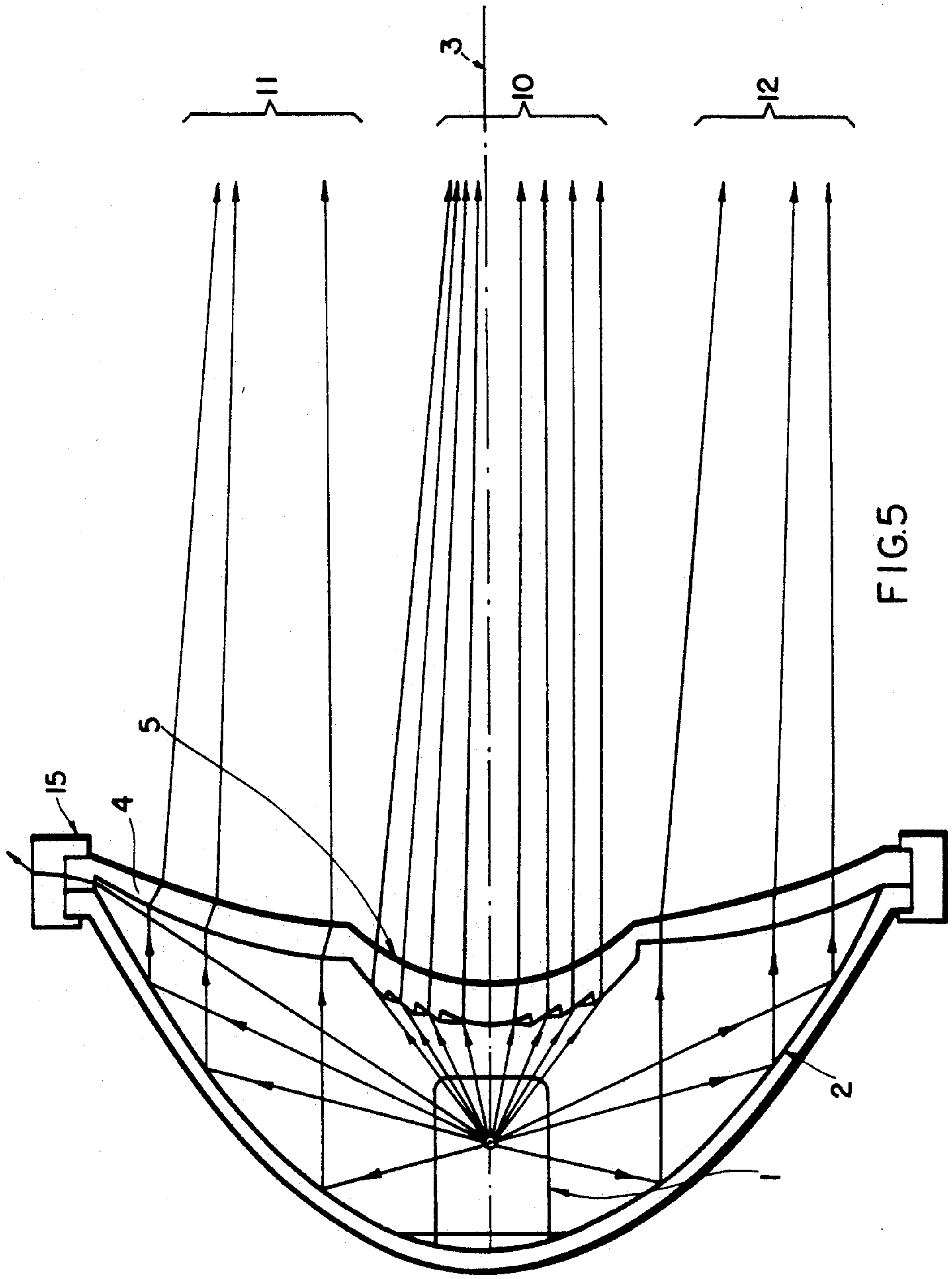
FIG. 5 is an illustration similar to the illustration of FIG. 1 of a second embodiment of the inventive headlight.

FIG. 5 illustrates, finally, a somewhat modified embodiment of the light ray guiding disk 4. According to the illustration, the difference between this embodiment and the embodiment of FIG. 1 is that the central zone 5 forms itself once more a domed structure facing the source of light 1. By means of such a design it is made possible that the spatial angle of the direct light rays which is covered can be made still larger.

Figure 6:
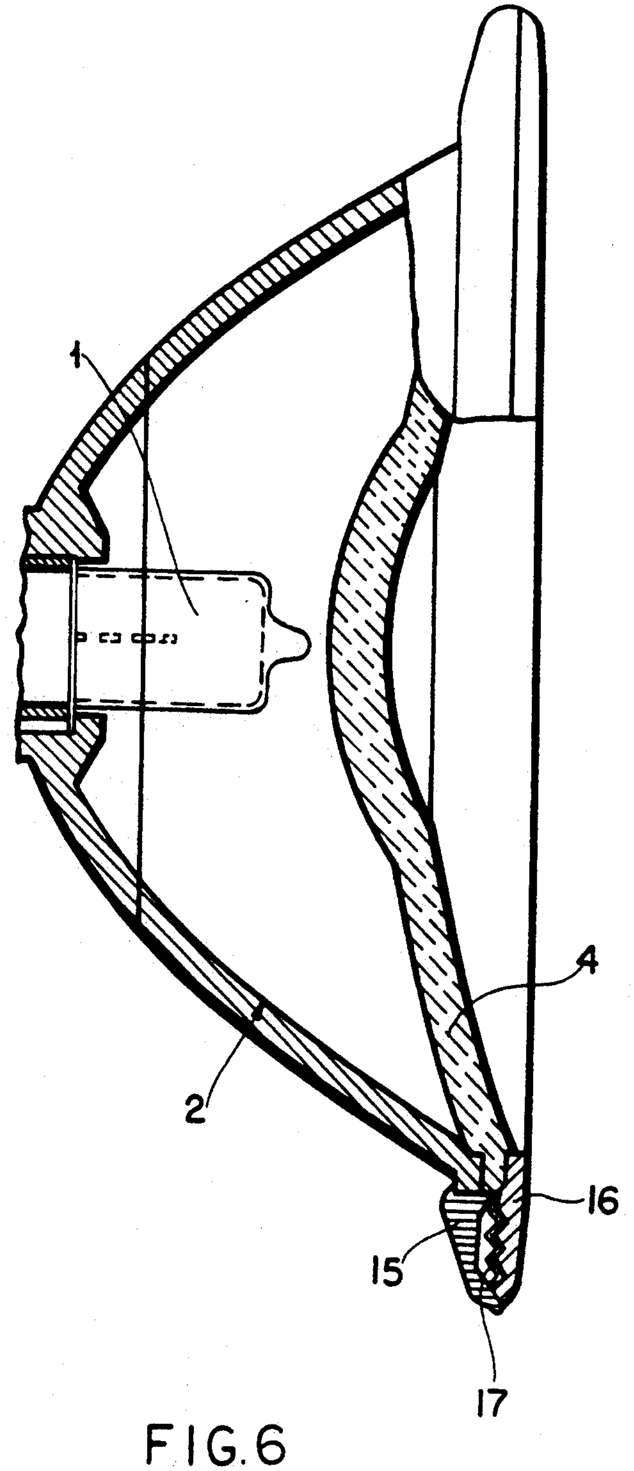
FIG. 6 illustrates yet a further embodiment of the headlight having an additional reflector ring.

FIG. 6 illustrates that the described headlight can additionally be equipped with a reflector ring 16 facing forwards. Should the source of light 1 or its power supply fail, this reflector ring 16 would allow a visibility of the bicycle for oncoming traffic in the night, in spite of such failure. The reflector ring 16 made of a transparent plexiglass has a reverse side 17 having a reflector structure. It is welded to a ring as signal ring 15 and made of a transparent red plexiglass, through which stray light can exit laterally in a manner disclosed above. The entire structure can be designed as snap-on ring for a mounting of the light ray guiding disk 4 at the reflector 2. In this embodiment the inventive headlight provides an integrated, actively and passively operating optical marking in traffic.

In summarizing, the disclosed headlight allows to optimally utilize sources of light having a relatively low output for the generating of light, such as e.g. encountered in bicycle lighting devices, in that the losses due to light fog or stray light, respectively, are decreased and the light rays are emitted in an optimal manner in a directed state such that ahead of the bicycle a vast light spot, having a uniform distribution of light, is produced on the roadway. The components, specifically the light ray guiding disk, lend themselves to be manufactured by efficient methods as shaped or formed, respectively, articles.

While there are shown and described present preferred embodiments of the invention, it is to be distinctly understood that the invention is not limited thereto, but may be otherwise variously embodied and practiced within the scope of the following claims.

We claim:

1. A headlight for emitting light rays substantially along a headlight axis, said headlight having:

a light source located on the headlight axis
a reflector member, and
a transparent cover plate located in front of the light source;
in which said transparent cover plate is made of an integral body having an inwardly domed section facing said light source, said inwardly domed section comprising a central zone adjacent to the light source which is structured as a collective lens for deflecting light being incident directly from the light source and further comprising outer edge zones surrounding said central zone for deflecting light being incident via the reflector member,
wherein at least some of said central and outer edge zones are provided with additional curvatures to direct light rays in a lower area of the each zone into a plane substantially parallel to said headlight axis and to increasingly deflect light rays of an upper area of each zone downwards into directions deviating from said plane.

2. The headlight of claim 1, wherein said collective lens is a Fresnel lens.

3. The headlight of claim 1, wherein said additional curvature superimposed to each zone in its vertical section forms a fourth order curve.

4. The headlight of claim 1, in which said transparent cover plate is structured as a formed article of a substantially equal thickness.

5. The headlight of claim 1, in which said outer edge zones are formed to deflect the light rays being incident from the reflector member in such a manner that a laterally diverging cone of light rays is generated.

6. The headlight of claim 1, in which the central zone comprises an additional domed section facing the light source.

7. The headlight of claim 1, in which a transparent ring is formed at the periphery of the transparent cover plate through which stray light exits radially.

8. The headlight of claim 1, in which said transparent ring has a signal color.

9. The headlight of claim 7, in which the transparent ring is structured as support ring for the mounting of the transparent cover plate to said reflector member.

10. The headlight of claim 1, in which the light source is a halide light.

11. The headlight of claim 1, in which said headlight is a bicycle light.

12. A headlight for emitting light rays substantially along a headlight axis, said headlight having:

a light source located on the headlight axis a reflector member, and a transparent cover plate located in front of the light source;

in which said transparent cover plate is made of an integral body having an inwardly domed section facing said light source, said inwardly domed section comprising a central zone adjacent to the light source which is structured as a collective lens for deflecting light being incident directly from the light source and further comprising outer edge zones surrounding said central zone for deflecting light being incident via the reflector member, wherein a transparent ring is formed at the periphery of said transparent cover plate through which stray light exits radially.

13. The headlight of claim 12 in which said transparent ring has a signal color.

14. The headlight of claim 12, in which said transparent ring is structured as a support ring for mounting said transparent cover plate to said reflector member.

* * * * *